(12) United States Patent
Chuang et al.

(10) Patent No.: US 7,701,727 B2
(45) Date of Patent: Apr. 20, 2010

(54) PORTABLE ELECTRONIC DEVICE

(75) Inventors: Yung-Chuan Chuang, Tu-Cheng (TW);
Pao-Ching Mao, Tu-Cheng (TW);
Chi-Chang Cheng, Tu-Cheng (TW);
Kuo-Heng Sun, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 0 days.

(21) Appl. No.: 12/339,281

(22) Filed: Dec. 19, 2008

(65) Prior Publication Data

US 2009/0310315 A1    Dec. 17, 2009

(30) Foreign Application Priority Data

Jun. 12, 2008    (CN) .................... 2008 1 0302114

(51) Int. Cl.
*H05K 7/14*    (2006.01)
*H05K 7/18*    (2006.01)

(52) U.S. Cl. .................. 361/797; 361/752; 361/760

(58) Field of Classification Search ................. 361/760, 361/767, 777, 748, 736, 715, 752, 797, 800
See application file for complete search history.

(56) References Cited

U.S. PATENT DOCUMENTS

| 5,722,055 A * | 2/1998 | Kobayashi et al. | ........ 455/575.8 |
| 6,614,905 B1 * | 9/2003 | Kristensen | .................... 379/368 |
| 2005/0184970 A1 * | 8/2005 | Wegert et al. | ................ 345/173 |
| 2008/0226375 A1 * | 9/2008 | Hsu | ............................ 400/490 |

* cited by examiner

*Primary Examiner*—Hung S Bui
(74) *Attorney, Agent, or Firm*—Steven M. Reiss

(57) ABSTRACT

A portable electronic device (10) includes a body section (11), a film keypad (12), a printed circuit board (13) and a positioning device. The body section (11) defines an opening (111). The film keypad (12) is mounted to the body section (11). The positioning device is configured for aligning the film keypad (12) with the printed circuit board (13).

4 Claims, 3 Drawing Sheets

PORTABLE ELECTRONIC DEVICE

BACKGROUND

1. Field of the Invention

The invention relates to portable electronic devices, and particularly, to a portable electronic device having a film keypad assembly.

2. Description of Related Art

With the ongoing development of technologies, keypad assemblies used in portable electronic devices such as mobile phones and personal digital assistants (PDAs) are becoming smaller and thinner.

A film keypad assembly typically includes a film and a printed circuit board (PCB). The film keypad assembly has a plurality of key patterns arranged on one side of the film and a plurality of protrusions protruding from the opposite side of the film to the key patterns. The protrusions are used to abut against electrical contacting points of the PCB.

However, when bonding the film to the PCB, the protrusions may not accurately abut against the corresponding electrical contacting points due to alignment errors.

Therefore, there is room for improvement within the art.

BRIEF DESCRIPTION OF THE DRAWINGS

Many aspects of the portable electronic device can be better understood with reference to the following drawings. These drawings are not necessarily drawn to scale, the emphasis instead being placed upon clearly illustrating the principles of the present portable electronic device. Moreover, in the drawings like reference numerals designate corresponding sections throughout the several views.

DETAILED DESCRIPTION OF EXEMPLARY EMBODIMENT

Figure 1:
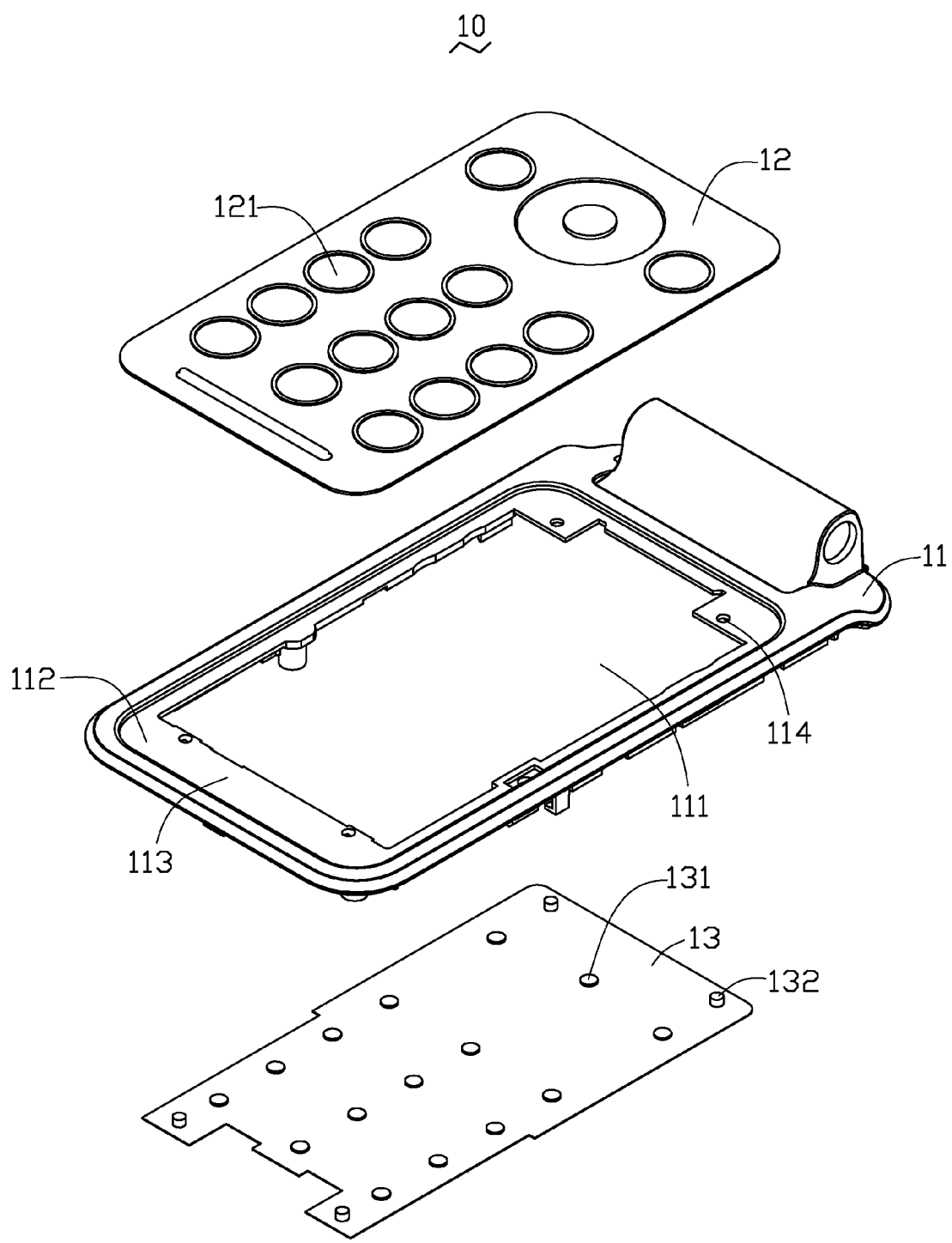
FIG. 1 is an exploded, isometric view of a portable electronic device, in accordance with an exemplary embodiment.
Figure 2:
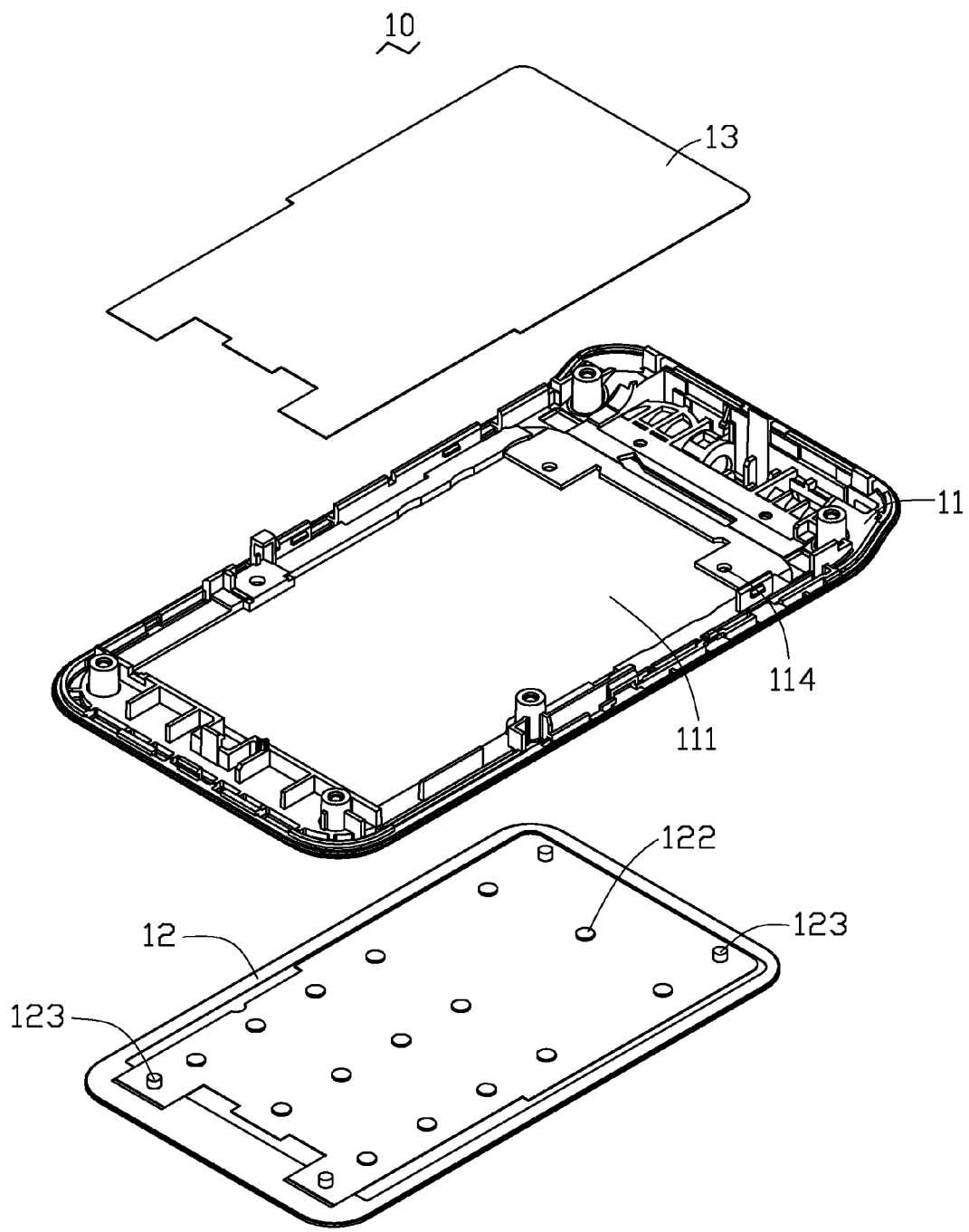
FIG. 2 is another exploded, isometric view of the portable electronic device shown in FIG. 1.

FIGS. 1 and 2 show an exemplary portable electronic device 10 including a body section 11, a film keypad 12 and a printed circuit board 13.

The body section 11 defines a generally rectangular opening 111, a limiting slot 112 surrounding the opening 111 and a bottom wall 113 adjacent to the opening 111. The opening 111 receives the printed circuit board 13, and the limiting slot 112 receives and secures the film keypad 12. The bottom wall 113 defines a plurality of fastening holes 114. In the exemplary embodiment, the bottom wall 113 has four fastening holes 114.

A plurality of key patterns 121 are arranged (e.g., coated or printed) on one side of the film keypad 12 facing away from the body section 11. A plurality of protrusions 122 corresponding to the key patterns 121 protrude from the opposite side of the film keypad 12. The protrusions 122 are oppositely aligned with the key patterns 121. A plurality of fastening columns 123 are formed on the same side of the film keypad 12 as the protrusions 122. The number of fastening columns 123 typically corresponds to the number of fastening holes 114.

The printed circuit board 13 has a plurality of electrical contacting points 131 arranged on the side of the printed circuit board 13 facing the body section 11, and a plurality of positioning columns 132 protruding from the same side of the printed circuit board 13 as the electrical contacting points 131. The contacting points 131 contact the protrusions 122 to input commands to the portable electronic device. The number of positioning columns 132 corresponds to the number of fastening holes 114. The printed circuit board 13 can be received in the opening 111.

Figure 3:
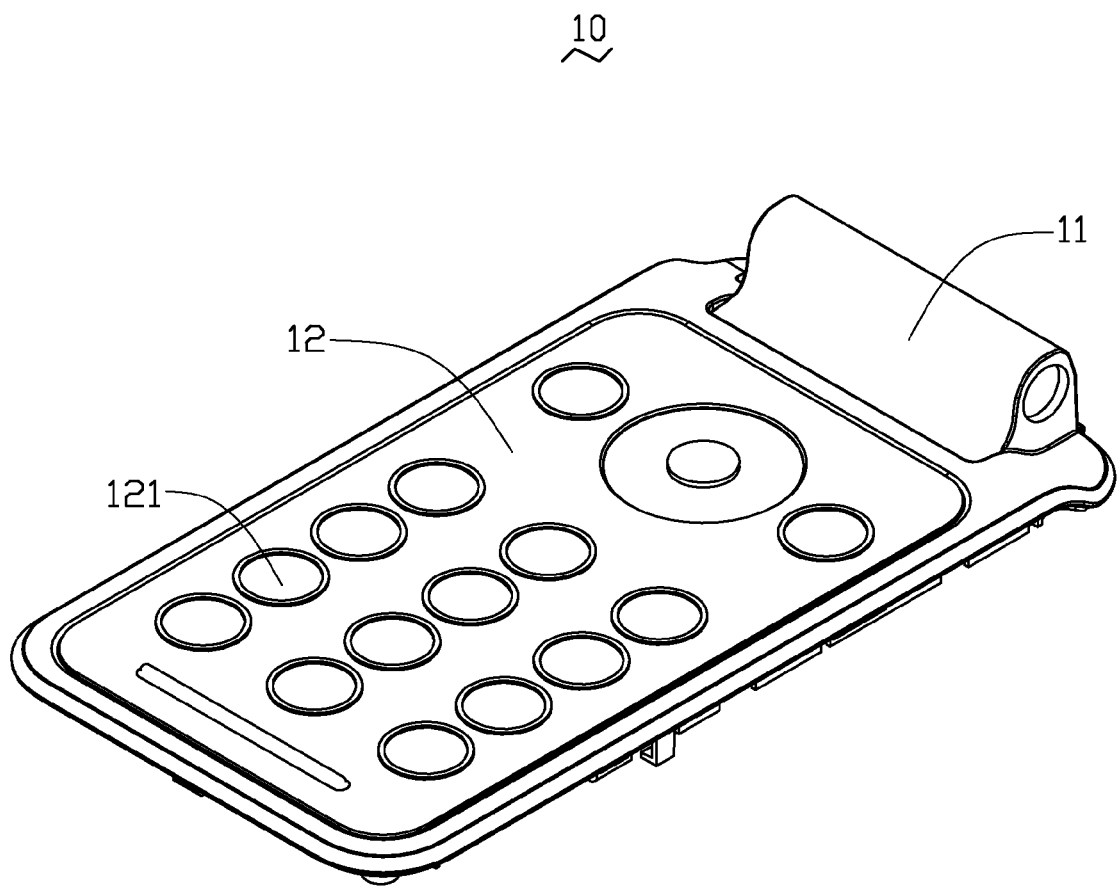
FIG. 3 is an isometric, assembled view of the portable electronic device shown in FIG. 1.

Referring to FIG. 3, during assembly, the film keypad 12 is mounted into the limiting slot 112. The fastening columns 123 are inserted into the corresponding fastening holes 114 from one side of the body section 11. The printed circuit board 13 is mounted into the opening 111. The positioning columns 132 are also inserted into the corresponding fastening holes 114 from the other side of the body section 11. Thus, since both the film keypad 12 and the printed circuit board 13 are aligned with the same fastening holes 14, the protrusions 122 are accurately aligned with their corresponding electrical contacting points 131.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. A portable electronic device, comprising:
   a body section having four fastening holes defined therethrough, the four fastening holes arrayed in a rectangle;
   a film keypad mounted to the body section, a plurality of protrusions protruding from the film keypad, and four fastening columns protruding from the same side of the film keypad as the protrusions; and
   a printed circuit board mounted to the body section, a plurality of electrical contacting points arranged on one side of the printed circuit board, corresponding to the protrusions, and four positioning columns protruding from the same side of the printed circuit board as the electrical contacting points, each fastening column and one corresponding positioning column both engaging with one corresponding fastening hole so as to align each protrusion with one corresponding electrical contacting point.

2. The portable electronic device as claimed in claim 1, wherein the film keypad has a plurality of key patterns arranged opposite to the protrusions.

3. The portable electronic device as claimed in claim 1, wherein the body section defines an opening, the printed circuit board being received in the opening, a limiting slot being defined around the opening, the film keypad being received and mounted in the limiting slot.

4. A method of aligning a film keypad with a printed circuit board, comprising:
   providing the film keypad with a plurality of protrusions and four fastening columns, thereof the fastening columns being arrayed in a rectangle;

providing the printed circuit board with a plurality of positioning columns and four positioning columns arrayed in a rectangle;

providing a body section having first and second opposite sides with four fastening holes arrayed in a rectangle extending through the body section;

using the fastening columns and the fastening holes to mount the film keypad to the body section from the first side;

using the positioning columns and the fastening holes to mount the printed circuit board to the body section from the second opposite side.

* * * * *